July 21, 1942.   J. Y. BLAZEK   2,290,731
CHUCK
Filed March 26, 1940   2 Sheets-Sheet 1

INVENTOR.
JOHN Y. BLAZEK
BY
ATTORNEYS.

July 21, 1942.                 J. Y. BLAZEK                 2,290,731
                                  CHUCK
              Filed March 26, 1940              2 Sheets-Sheet 2
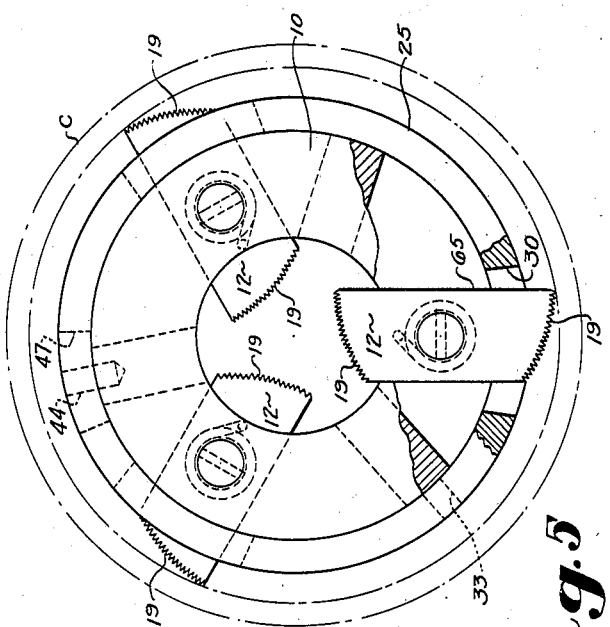
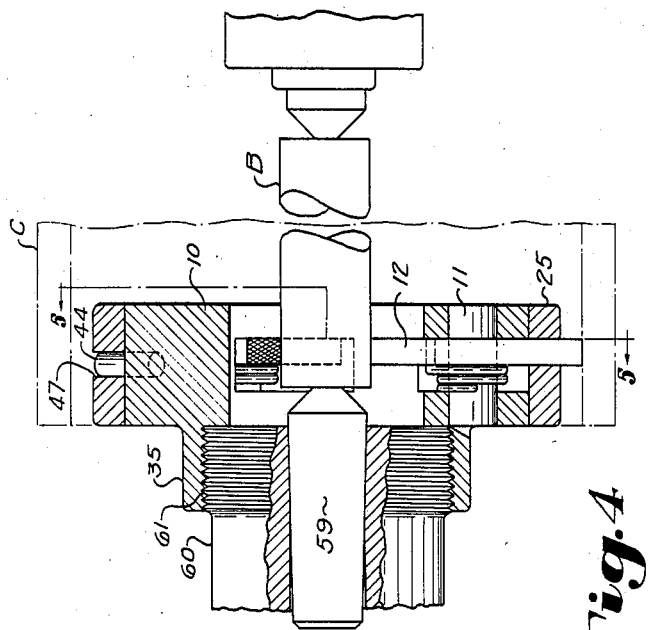
INVENTORS.
JOHN Y. BLAZEK
BY
Fay, Golrick, Williams & Fay
ATTORNEYS.

Patented July 21, 1942

2,290,731

UNITED STATES PATENT OFFICE 2,290,731

CHUCK

John Y. Blazek, Bedford, Ohio, assignor to Lempco Products, Inc., Bedford, Ohio, a corporation of Ohio Application March 26, 1940, Serial No. 325,993

3 Claims. (Cl. 279—33)

This invention relates, generally, as indicated, to a chuck and has reference more particularly to a chuck which is adapted for use in conjunction with conical or tapered surfaces.

Difficulty has heretofore been experienced in accurately chucking a tapered surface. This difficulty is more acute when an adapter especially designed for the taper in question is not available and consequently a need is felt for a chuck adapted for use in conjunction with tapered surfaces regardless of the variation in the degree of taper and regardless of the variation in the diameter of the portions of successive articles to be chucked—a universal chuck.

The cardinal object of this invention has been to provide a chuck which is adapted for use in conjunction with an article having tapered surfaces.

Another object of this invention has been to provide a device of the character identified which is adapted for use in conjunction with articles having tapered surfaces regardless of the length of such surfaces within predetermined limits.

Another object of this invention has been to provide a device of the type described which is adapted for use as a journal for a tool.

A further object of this invention has been to provide a chuck of the character described which rapidly and efficiently grips and releases an article.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various structural forms in which the principle of the invention may be used.

In said annexed drawings:

Fig. 4 is a vertical section taken perpendicular to the axis of a device embodying a modification of this invention; and Fig. 5 is a partially fragmentary section taken along the line 5—5 of Fig. 4.

Figure 1:
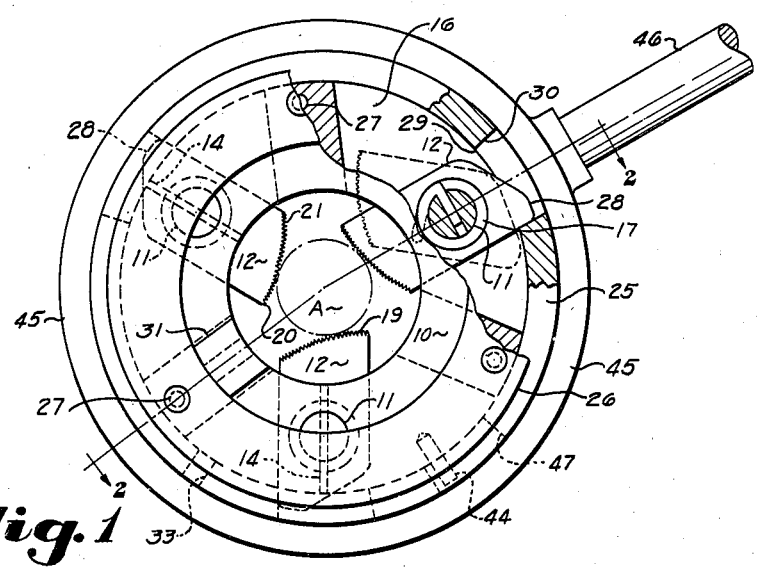
Fig. 1 is a fragmentary side elevation of a device embodying this invention.
Figure 2:
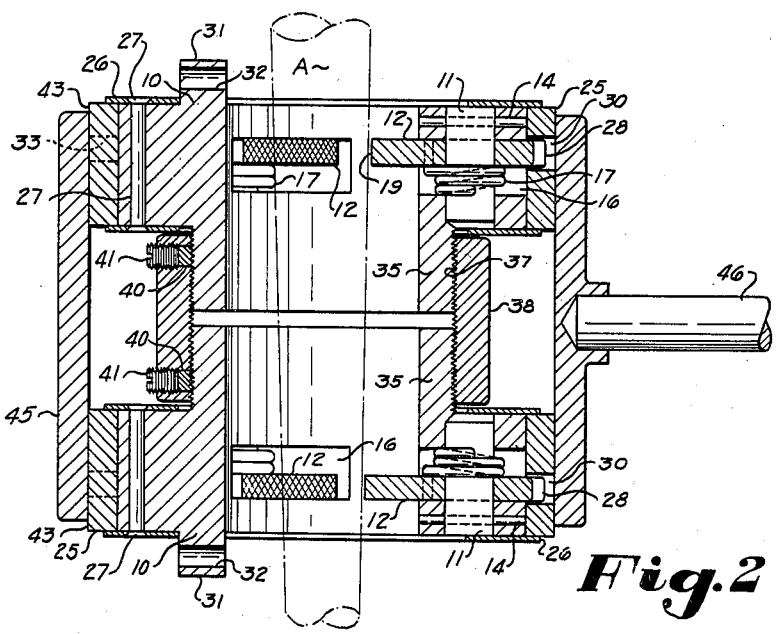
Fig. 2 is a section indicated by lines 2—2 of Fig. 1.

Having reference now more particularly to Figs. 1 and 2, a pair of sleeves 10 is provided and each, by means of a plurality of pins 11, rotatably supports a plurality of jaws 12 which are adapted for engaging an article A inserted therebetween. Each of the pins 11 is suitably secured to its respective sleeve by a key 14. The sleeves are provided with recesses 16 for accommodating the jaws and springs 17 for urging inwardly the gripping faces 19 of the jaws. These gripping surfaces are slightly ruffed or knurled so as to prevent their slipping on the article. Each face is convex, as is seen in Fig. 1, and one end 20 thereof is further from the pin than is the other end 21. From the foregoing it will be seen that rotation of the sleeve 10 in a counterclockwise direction as viewed in Fig. 1 will cause the jaws to tighten against the article A.

Means are provided for simultaneously releasing the set of jaws associated with each of the sleeves and for causing each of the jaws of any one set to be pivoted within predetermined limits to the same extent. Thus, the jaws not only grip the article A but also center it with respect to the sleeve 10.

Such means comprise outer sleeves 25 one rotatably carried by each of the sleeves 10, locked against relative axial movement with respect thereto by washers 26 which are secured to sleeves 10 by suitable means such as rivets 27 and locked against relative rotation by suitable means such as a set screw. Each of the sleeves 25 has therein a plurality of slots 30 for accommodating the outer ends 28 of the jaws. It is thus seen that rotation of the sleeve 25 in a clockwise direction as viewed in Fig. 1 relatively to the sleeve 10 will pivot the jaws away from and release the article A. Continued movement in the same direction causes one edge 29 of each slot to break contact with its associated jaw and cause the outer end of such jaw to rest against the inner periphery of the outer sleeve 25. When this occurs the jaws may be described as being "locked open" and permit the article A to be freely inserted into the sleeve 10.

The slots 30 and jaws 12 are equally spaced circumferentially, and consequently if the outer sleeve 25 is rotated counterclockwise as viewed in Fig. 1 sufficiently to release the jaws from the "locked open" position, the springs 17 will force the outer ends of the jaws against the edge 29 of each slot so that each jaw is equally spaced from the axis of the sleeve 10. Further movement of the outer sleeve 25 permits each jaw to move inwardly an equal amount and thus causes the jaws of each set of jaws to simultaneously contact the surface of the article A. When the jaws have thus established contact with the article A they are maintained thereagainst by means of the springs 17. In order to lock the article between the jaws, the outer sleeve 25 is further rotated in a counter-clockwise direction, as viewed in Fig. 1, until the edges 29 break contact with the jaws and the other ends of the slots make contact with the outer ends of the jaws. This situation is illustrated by the full lines in Fig. 1 and it is obvious that further rotation of the outer sleeve in the same direction will force each of the jaws inwardly and securely lock the article therebetween.

Since there is provided two sets of jaws, one for each of the sleeves 10 and outer sleeves 25, it is obvious that each of the sets of jaws may be independently actuated with respect to the other set of jaws and since each set of jaws centers its associated sleeves 10 and 25 with respect to surface of the article contacted by the jaws, it follows that all of the sleeves 10 and 25 and the article A are co-axial.

In order to facilitate relative rotation of the sleeves 10 and 25 with respect to each other, there is provided on each of the sleeves 10, a lug 31 having an opening 32 and in each of the outer sleeves 25, there is provided an opening 33. By inserting a lever in the holes 32 and 33 the sleeves may be readily rotated and the article secured chucked.

In order to axially adjust the space between the sets of jaws each of the sleeves 10 is provided with an axial projection 35, the outer periphery of which is threaded for engagement with the threaded inner periphery 37 of a collar 38. The inner periphery 37, may have one continuous thread or it may be provided with opposite threads each covering one-half of the axial distance whereby rotation of the collar more rapidly adjusts the space than would be the case if a single thread were provided. In order to secure each of the sleeves 10 to the collar 38, the latter is provided with a pair of soft movable shoes or plugs 40 and the screws 41 for pressing the plugs against the threaded portion of the projections of the sleeves 10.

The outer peripheries 43 of the outer sleeves 25 are elements of the same cylinders. Rotatably journalled and axially slidable on the outer peripheries 43 is a tool support 45 from which projects a tool post 46.

Figure 3:
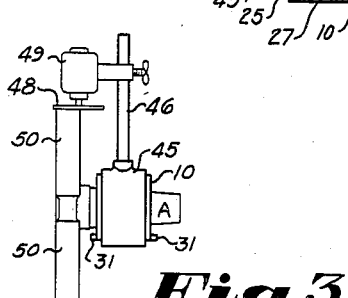
Fig. 3 is a side view of a device embodying this invention mounted upon an axle shaft and adapted for supporting an instrument.

In Fig. 3, the above described device is illustrated mounted upon an article which is in the form of the tapered outer end of a vehicle axle shaft. Suitably supported by the tool post 46, is an instrument 48 adapted for acting upon the lining of brake shoes 50.

The instrument 48 may take the form, as shown, of an abrading disc driven by a motor 49 or any other desired tool such as an indicator. By swinging the tool post 46 and consequently the tool support 45 around the outer sleeve 25 and inner sleeve 10 it is seen that the entire brake shoe lining may be acted upon by the tool.

A pin 44 carried by each of the inner sleeves 10 occupies a slot 47 in each of the outer sleeves 25 and thus restricts the amount of relative rotation between the sleeves.

It is thus seen that notwithstanding the amount of taper on the article A, and notwithstanding the diameters of the articles A which are to be gripped by the jaws, a device constructed in accordance with this invention can be within predetermined limits quickly and securely attached to the article.

In the alternative construction illustrated in Figs. 4 and 5, wherein like reference characters indicated like parts, the device heretofore described is adapted for use as means for driving an article mounted machine tool, such as in a lathe or the like. In this form of the invention it is sometimes preferable to utilize only one set of jaws and consequently one of the sleeves 10 and its dependent elements, lugs 31, the collar 38, the washers 26 and the tool support 45 and its dependent elements may be eliminated.

In Fig. 4 the article in the form of a blank B to be machined is mounted between a pair of centers, one of which, such as the left one 59, is carried by a spindle 60. The projection 35 of the sleeve 10, instead of being threaded on its outer periphery is provided with threads 61 on its inner periphery for engaging the threads normally provided on the spindle. When the faces of the tool or tools acting on the article are within certain limits, the center 59 may be eliminated. The jaws, which are better seen in Fig. 5, have article engaging or gripping faces 19 on each end thereof. One of the faces is disposed interiorly and the other exteriorly of the sleeves 10 and 25 so that a mid-portion 65 of each jaw is engaged by the slots 30 of the sleeve 25. The mid-section 65 of the jaws, cooperating with the slot 30 and the pin 44 and cooperating with the slot 47 may be relied upon for sufficiently limiting axial movement of the outer sleeve 25 with respect to the sleeve 10. By inserting a bar in the slot 33 and using it as a lever the outer sleeve 25 may be rotated with respect to the inner sleeve because spindle 60 offers sufficient resistance to rotation of the inner sleeve. When the lathe is turned on, the spindle 60 will rotate counter-clockwise, as seen in Figs. 1 and 5 and the jaws will lock themselves against the article.

The exteriorly disposed faces of the jaws are adapted for chucking interiorly of a bored article C such as is shown by the dotted lines in Fig. 5.

It will be understood that the jaws of Figs. 4 and 5 could be the same as in the preferred embodiment.

It will be further understood that in Figs. 4 and 5 the inner gripping faces of the jaws could be eliminated and the jaws pivoted relatively to the sleeve 25 instead of the sleeve 10 and that then the device could be "locked open."

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a device of the character described, the combination of a pair of sleeves each of which are adapted for receiving an article interiorly thereof, a plurality of jaws carried by each of said sleeves for engaging an article and a collar threaded to both of said sleeves whereby the axial distance between said sleeves may be adjusted to any pre-selected degree.

2. The combination of a pair of relatively rotatable interfitting sleeves each provided with a plurality of openings, the openings of one of the sleeves being adapted for registration with the openings of the other of said sleeves, a plurality of jaws pivotally carried by one of said sleeves, disposed in said openings, and projecting interiorly and exteriorly of said sleeves, the interiorly projecting portion and the exteriorly projecting portion of said jaws being provided with eccentric gripping faces the centers of which are disposed on the same side of that radius of said sleeves which passes through the pivotal axis of said jaws.

3. The combination of a pair of interfitting relatively rotatable sleeves each provided with a plurality of openings, the openings of one of the sleeves being adapted for registration with the openings of the other of said sleeves, a plurality of jaws pivotally carried by one of said sleeves, disposed in registering openings and projecting interiorly and exteriorly of both of said sleeves, the interiorly projecting portion and the exteriorly projecting portion of each of said jaws being provided with convex gripping faces, the faces of any one jaw converging in one direction whereby rotation of said sleeves in the opposite direction causes the interiorly projecting portions to grip the exterior periphery of an article and the exterior projecting portions to grip the interior periphery of an article.

JOHN Y. BLAZEK.